(12) United States Patent
Binzel et al.

(10) Patent No.: US 7,715,333 B2
(45) Date of Patent: May 11, 2010

(54) INCOMING MESSAGE DECODING IN WIRELESS COMMUNICATIONS DEVICES AND METHODS

(75) Inventors: Charles Binzel, Bristol, WI (US); Ouelid Abdesselem, Toulouse (FR); Benoit Boyer-Noel, Grisolles (FR); Mark Kaluzny, Gurnee, IL (US); Estelle Menu, Ramonville St. Agne (FR); Daniela Radakovic, Park Ridge, IL (US)

(73) Assignee: Motorola, Inc., Schaumburg, IL (US)

( * ) Notice: Subject to any disclaimer, the term of this patent is extended or adjusted under 35 U.S.C. 154(b) by 1967 days.

(21) Appl. No.: 10/637,124

(22) Filed: Aug. 8, 2003

(65) Prior Publication Data

US 2005/0030914 A1 Feb. 10, 2005

(30) Foreign Application Priority Data

Aug. 13, 2002 (EP) .................................. 02292026

(51) Int. Cl.
*G08C 17/00* (2006.01)
*H04M 1/00* (2006.01)
*H04B 1/16* (2006.01)

(52) U.S. Cl. ........................ 370/311; 370/313; 455/574; 455/343.2

(58) Field of Classification Search ................. 455/574, 455/434, 515, 343.1, 343.2, 343.3, 343.4; 370/311, 313, 347

See application file for complete search history.

(56) References Cited

U.S. PATENT DOCUMENTS

| | | | |
|---|---|---|---|
| 5,404,374 A * | 4/1995 | Mullins et al. ............... 375/133 |
| 5,570,369 A | 10/1996 | Jokinen | |
| 5,809,419 A | 9/1998 | Schellinger et al. | |
| 5,930,706 A | 7/1999 | Raith | |
| 5,978,366 A * | 11/1999 | Massingill et al. .......... 370/337 |
| 6,275,680 B1 | 8/2001 | Martin et al. | |
| 6,717,985 B1 * | 4/2004 | Poon .......................... 375/229 |
| 7,035,234 B2 * | 4/2006 | Toskala et al. .............. 370/329 |
| 7,107,080 B2 * | 9/2006 | Patel et al. ................... 455/574 |
| 2001/0015963 A1 * | 8/2001 | Tuomainen et al. ......... 370/311 |
| 2001/0023184 A1 | 9/2001 | Kalveram et al. | |
| 2002/0101846 A1 | 8/2002 | Erben et al. | |
| 2003/0156551 A1 * | 8/2003 | Inoue et al. ................. 370/252 |
| 2006/0085552 A1 * | 4/2006 | Sollenberger et al. ....... 709/232 |
| 2006/0104204 A1 * | 5/2006 | Hansson et al. ............. 370/235 |

FOREIGN PATENT DOCUMENTS

| | | |
|---|---|---|
| DE | 198 13 507 C2 | 10/2000 |
| EP | 0 673 175 A2 | 9/1995 |
| EP | 0673175 A | 9/1995 |

(Continued)

*Primary Examiner*—Nguyen Vo
(74) *Attorney, Agent, or Firm*—Roland K. Bowler, II

(57) ABSTRACT

A method in a mobile wireless communication device capable of receiving a paging message transmitted in a series of bursts over successive time frames including receiving (210) not more than one burst of an incoming paging message, determining (220) whether the incoming paging message corresponds to a known paging message, and (230) reducing power consumption of radio circuits of the mobile wireless communication device during time frames when other bursts would be received if the incoming paging message corresponds to the known paging message. If the incoming data does not correspond to the known data, additional burst are received and decoded.

17 Claims, 4 Drawing Sheets

FOREIGN PATENT DOCUMENTS

| | | |
|---|---|---|
| EP | 0 780 989 A2 | 6/1997 |
| GB | 2 358 767 A | 8/2001 |
| WO | WO 98/48521 | 10/1998 |
| WO | WO 00/22858 | 4/2000 |
| WO | WO 01/76295 A2 | 10/2001 |

\* cited by examiner

INCOMING MESSAGE DECODING IN WIRELESS COMMUNICATIONS DEVICES AND METHODS

FIELD OF THE INVENTIONS

The present disclosure relates generally to wireless communications, and more particularly to incoming message decoding in wireless communications devices capable of receiving information transmitted in portions over successive intervals, for example, cellular communications handsets that receive messages transmitted in a series of bursts over consecutive TDMA time frames, methods and apparatuses therefor.

BACKGROUND OF THE INVENTIONS

The Groupe Special Mobile (GSM) communication protocol includes two general classes of communications channels, dedicated channels and broadcast channels. The common channels are based on a 51 TDMA frame cycle including multiple Common Control Channel (CCCH) frames, Frequency Control Channel (FCCH) frames, and Synchronization Channel (SCH) frames. The CCCH may be an Access Grant Channel (AGCH) or a Paging Channel (PCH). Channel information is transmitted during multiple time-slots in consecutive frames. For example, every CCCH data block is transmitted in a series of four data bursts in corresponding time-slots of consecutive CCCH time frames.

It is known to conserve power in wireless communications devices operating in idle mode when not communicating by configuring radio circuits and a digital signal processor (DSP) in sleep mode. The microprocessor control unit (MCU) wakes-up the radio circuits and the DSP from sleep mode with a command when it is time to receive incoming data bursts, which are transferred to the DSP from the radio circuits. The radio circuits and DSP must remain awake to receive all data bursts in each data block, for example during the $1^{st}$, $2^{nd}$, $3^{rd}$ and $4^{th}$ time frames of a CCCH message. A command from the MCU on the final burst instructs the DSP to decode the PCH burst data. After the DSP decodes the burst data received, the DSP sends the decoded data to the MCU.

U.S. Pat. No. 5,570,369 entitled "Reduction of Power Consumption In A Mobile Station" discloses attempting to recover data bits of a four-burst message by de-interleaving data from at least $1^{st}$ and $2^{nd}$ bursts while assuming that data from the remaining bursts of the message are unreliable. The de-interleaved data bits are de-convoluted with a Modified Selective-Repeat Type-II Hybrid ARQ based de-convolution algorithm, and the result is FIRE decoded in an effort to reconstruct the original information. If reconstruction is unsuccessful, then a $3^{rd}$ data burst is received and the de-interleaved data bits thereof are combined with the de-interleaved $1^{st}$ and $2^{nd}$ data bits, and the combined data bits are de-convoluted with a Viterbi algorithm before FIRE decoding. Power consumption of the device is reduced by operating radio circuits of the mobile station in sleep mode during the time frames when the $3^{rd}$ and/or $4^{th}$ bursts are transmitted if the original information may be reconstructed with only two or three data bursts. The methods of U.S. Pat. No. 5,570,369 require receiving at least the $1^{st}$ and $2^{nd}$ bursts of the four-burst PCH or BCCH message transmitted.

The various aspects, features and advantages of the present invention will become more fully apparent to those having ordinary skill in the art upon careful consideration of the following Detailed Description with the accompanying drawings described below.

DETAILED DESCRIPTION OF THE INVENTIONS

Figure 1:
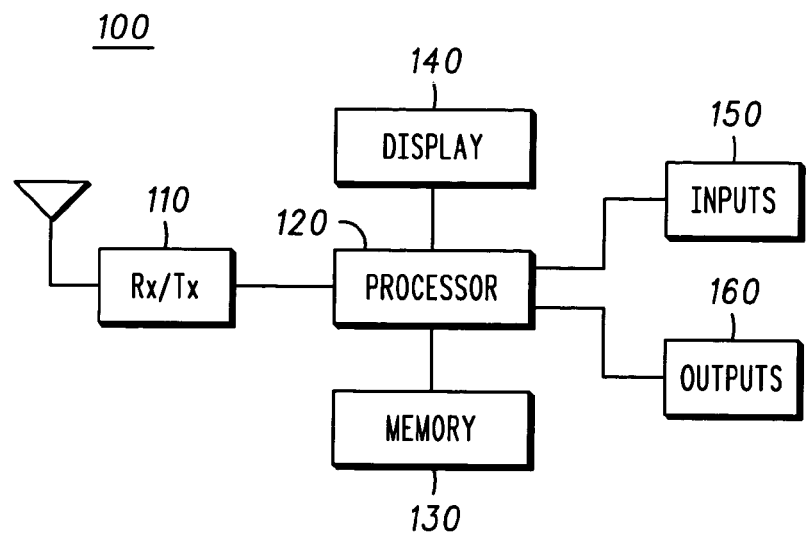
FIG. 1 is an exemplary mobile wireless communications device.

FIG. 1 is a mobile wireless communications device 100 capable of receiving incoming messages transmitted in a series of portions over successive intervals, for example a wireless GSM cellular communications handset capable of receiving incoming messages transmitted in a series of bursts over consecutive TDMA timeframes. The disclosure is applicable more generally to any receiver that receives information in portions in successive time intervals.

The device 100 comprises generally a transceiver 110 coupled to a processor 120, which includes a micro-controller and in some preferred embodiments a digital signal processor (DSP). Memory 130, for example a ROM, RAM and in some embodiments a PROM, is coupled to the processor. The exemplary device 100 also includes a visual display device 140, for example, an LCD display, coupled to the processor. The device also includes input devices 150, like a microphone, keypad and other inputs, and output devices 160, including a loudspeaker, audio output connectors, etc.

Figure 2:
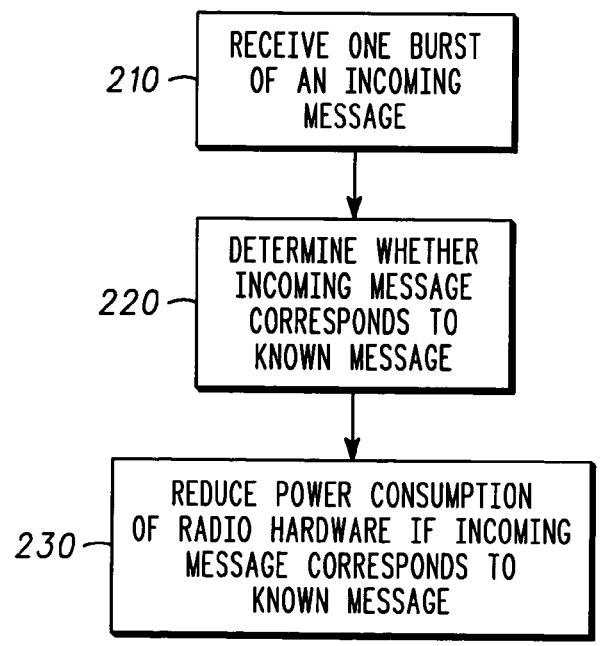
FIG. 2 is an exemplary process flow diagram.

In FIG. 2, at block 210, the mobile wireless communication device receives not more than one portion of information, for example burst data, in a corresponding interval or time-slot of one of a series of frames of an incoming message. At block 220, a determination is made whether the incoming message corresponds to a known message based on the not more than the one portion of the message received.

In one embodiment, the message is a paging message. In the GSM communications networks, for example, the device 100 receives Paging Channel (PCH) information transmitted in a series of four bursts in corresponding time-slots of consecutive CCCH frames. The PCH is a control channel used for paging a mobile station (MS) when there is an incoming call addressed to the MS. Every message on the PCH channel addressed to an MS contains the paged MS identity number, or the International Mobile Subscriber Identity (IMSI), or Temporary International Mobile Subscriber Identity (TIMSI). In the case where no MS is being paged, a "No Identity Page" or like message is sent on the PCH channel. At the mobile device, the decoded PCH burst data may indicate that the MS is being paged, or that another MS is being paged, or that no MS is being paged. Thus in some instances, the paging message is addressed to the MS, or a paging message is not addressed to any device, also referred to herein as a "No Identity Page". In other applications or embodiments, however, the message may be some message other than a paging message, and thus this aspect of the disclosure is not limited to paging messages.

In FIG. 2, at block 230, if the incoming message corresponds to the known message, radio circuit power consumption of the mobile wireless communication device is reduced during the time intervals when other bursts of the incoming message are transmitted and would be otherwise received. Under these circumstances, the device is able to conserve power since it is not necessary to receive the remaining bursts of the incoming message, since the incoming message has been decoded correctly from only a portion of the message transmitted.

Figure 3:
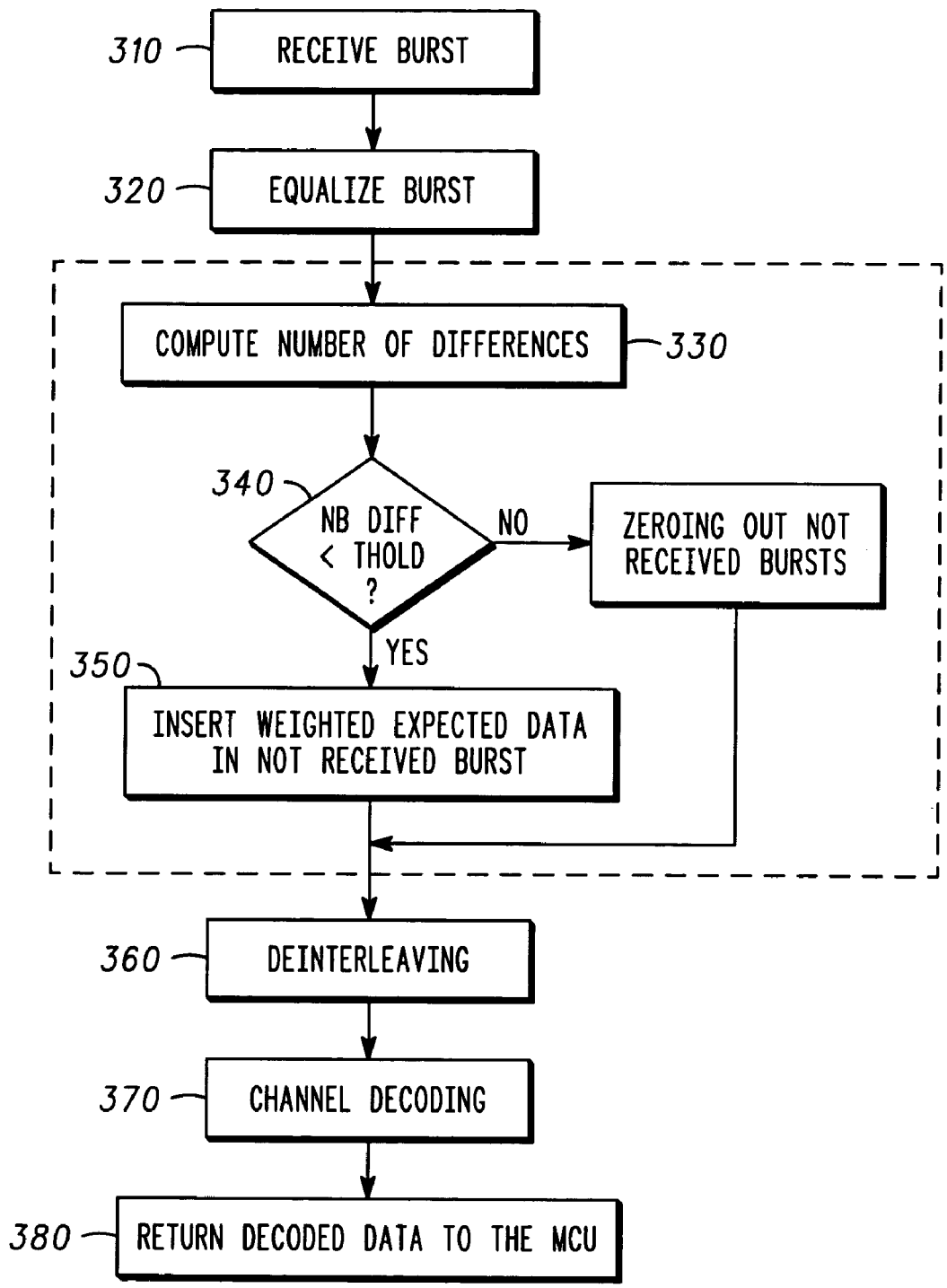
FIG. 3 is a more detailed burst data reception and decoding process flow diagram related to the process diagram of FIG. 2.

FIG. 3 is a more detailed burst data reception and decoding process flow diagram according to an exemplary embodiment. At block 310, a single burst is received for a first time frame. At block 320, after demodulation, incoming data bit detection occurs at block 320 in a channel equalizer. During equalization, the transmitted bit sequence is reproduced from the demodulated burst.

After equalization, the incoming data is compared with known data of a corresponding burst. For example, incoming data from the $1^{st}$ time frame of the incoming message is compared with known data from the $1^{st}$ time frame of a known message. In FIG. 3, at block 330, comparison of the known data and the incoming data is performed by computing the differences between the corresponding data bits of the incoming and known data, after equalization.

The known data used for the comparison may be obtained from a database stored on the device, for example data from a previously received message. The known data may be data from all bursts of the known message, or it may be partial data from only a portion of the bursts of the known message. The partial or complete data from the known message is stored after equalization.

If results of the comparison at block 330 satisfy a specified requirement indicating that there is a likelihood that the incoming message corresponds to the known message, the data from the received burst of the incoming message is combined with known data from other bursts of the known message and decoded as discussed further below. The extent of the correlation required between the incoming data and the known data at the comparison stage is based on empirical data and is dependent generally upon the quality of the channel and possibly other factors or conditions. The specified requirement may be judged relative to a difference threshold or a ratio or some other measure, which may be a function of channel quality, bit error rate, and a confidence factor, among other factors.

In FIG. 3, at block 340, if the specified requirement is satisfied, indicating the likelihood of a match, known data from the known message is combined at block 350 with the incoming data before deinterleaving at block 360. In one embodiment, the known data is rescaled based upon the channel conditions during which the incoming burst was received. In one embodiment, the rescaling is based upon the signal-to-noise ratio of the channel. The rescaling of the known data occurs prior to the combining of the known data with the incoming data.

Figure 4:
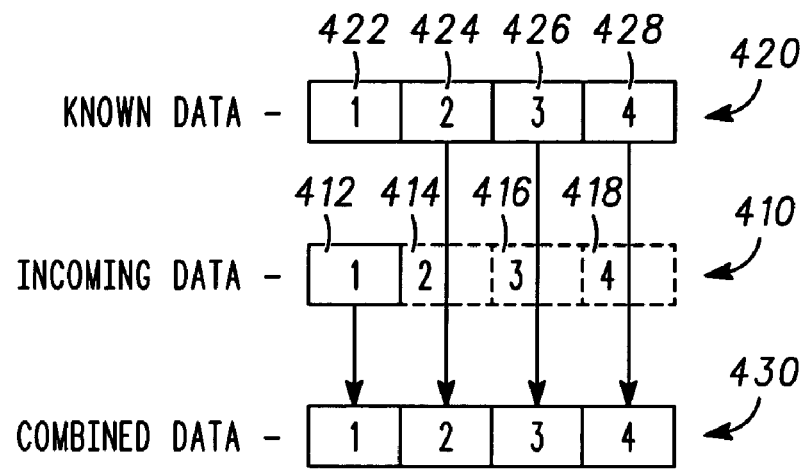
FIG. 4 illustrates combining incoming burst data from not more than one time frame with known burst data from other time frames where there is a likelihood that the incoming message corresponds to a known message.

FIG. 4 illustrates the combination of incoming data received from a burst in the $1^{st}$ time frame 412 of a four-burst message 410 with known stored data from bursts in the $2^{nd}$ through the $4^{th}$ time frames 424, 426 and 428 of a known four-burst message 420, thereby producing a combined data message 430. The combination of the incoming and known data occurs preferably after equalization and before deinterleaving. As noted, the known data may be rescaled based on present channel conditions prior to combining. In FIG. 4, the $2^{nd}$ through the $4^{th}$ time frames of the incoming data is illustrated in broken lines to indicate that the corresponding incoming bursts have not been received yet for these frames.

In another embodiment, the incoming data received is that of the $2^{nd}$ time frame 414 instead of the $1^{st}$ time frame 412. In this alternative embodiment, the incoming data 414 of the $2^{nd}$ time frame is combined with known data from the $1^{st}$, $3^{rd}$ and $4^{th}$ time frames of the known message. According to this embodiment, the radio circuits may be operated in reduced power consumption mode during the $1^{st}$ time frame. The reception of an incoming burst of the $2^{nd}$ time frame without receiving bursts of the $1^{st}$ time frame is preferably performed only when the channel quality is sufficiently good to ensure valid decoding of the incoming message with the incoming data of not more than the $2^{nd}$ through the $4^{th}$ time frames in the event that the incoming message does not correspond to the known message, or in the event that the incoming message cannot be decoded validly with the data from only the $2^{nd}$ time frame.

In another alternative embodiment, incoming data from the $3^{rd}$ time frame 416 may be combined with known data from the $1^{st}$, $2^{nd}$ and $4^{th}$ time frames, thus permitting reducing power consumption during the $1^{st}$ and $2^{nd}$ time frames 412 and 414. The reception of incoming bursts of the $3^{rd}$ time frame without receiving bursts of the $1^{st}$ and $2^{nd}$ time frames is preferably performed only when the channel quality is sufficiently good to ensure valid decoding of the incoming message with the incoming data of not more than the $3^{rd}$ through the $4^{th}$ time frames in the event that the incoming message does not correspond to the known message, or in the event that the incoming message cannot be decoded validly with the data from only the $3^{rd}$ time frame.

In FIG. 3, after combining at block 350, the combined data is deinterleaved at block 360 and decoded at block 370. The deinterleaving and decoding processes are known generally in the art. Decoding generally includes a de-convolution step, for example Viterbi decoding, and a subsequent validation operation, for example FIRE decoding having a cyclic redundancy check (CRC) algorithm, which performs limited error correction and indicates whether the message has been reconstructed correctly. The reconstructed message is returned to the processor or MCU at block 380.

During many time periods there are a substantial number of "No Identity Page" messages transmitted by the communication network, and thus substantial power savings may be attained by early detection of No Identity Page messages, without receiving all of four bursts.

In some embodiments, where MS processing capacity permits, the incoming data portion may be compared in parallel with corresponding portions of more than one known message, for example a "No Identity Page" and a page addressed to the MS, among other known messages.

If the decoded message is invalid or unreliable, additional bursts may be received and the incoming data therefrom may be used to reconstruct the incoming message. In FIG. 3, if the comparison results do not satisfy the specified requirement at block 340, the burst of a successive time frame is received and data from the two time frames is decoded.

Figure 6:
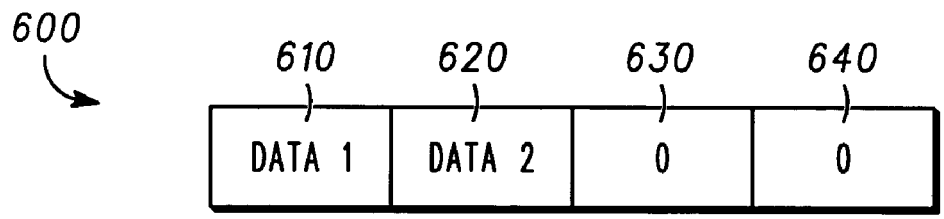
FIG. 6 illustrates a multi-frame message having data in $1^{st}$ and $2^{nd}$ frames and unreliable data in $3^{rd}$ and $4^{th}$ frames.
Figure 5:
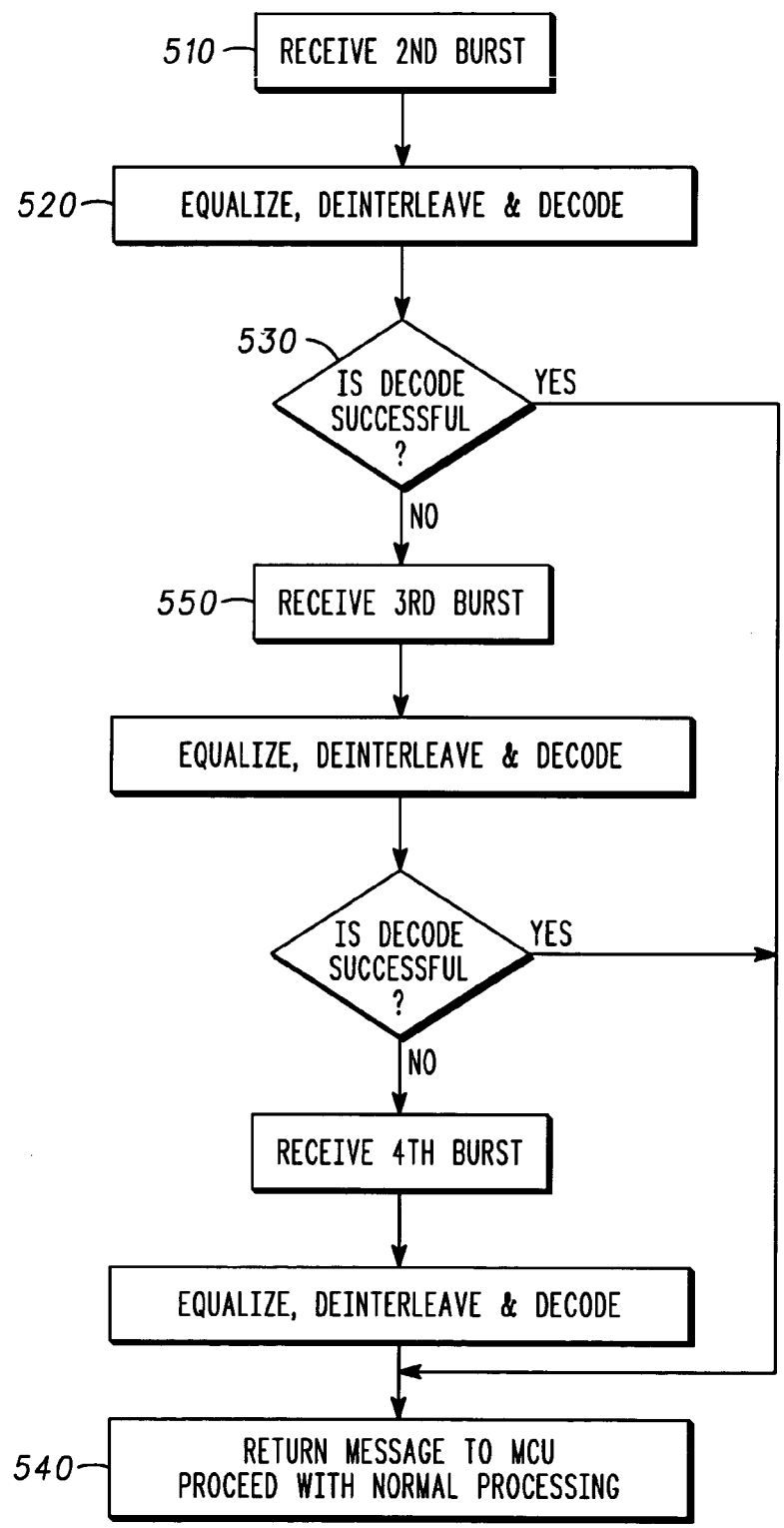
FIG. 5 is an exemplary process flow diagram where there is a not a likelihood that the incoming message corresponds to a known message.

In FIG. 5, at block 510, a $2^{nd}$ burst is received, and at block 520 incoming data from the $2^{nd}$ burst is recovered by the equalizer and subject to the deinterleaving operation. Thereafter, incoming data from the $1^{st}$ and $2^{nd}$ time frames are decoded. The data for the remaining time frames not yet received, e.g., the $3^{rd}$ and $4^{th}$ time frames, is marked as unreliable prior to decoding. FIG. 6 illustrates a four-frame message 600 having data bits in the first and second frames 610 and 620, but no data bits in frames 630 and 640, which are designated as having unreliable bits prior to deinterleaving and decoding.

In FIG. 5, at block 530, if decoding is successful, as determined for example by FIRE decoding, the results are sent to the processor at block 540. The radio circuits are also preferably operated in reduced power consumption mode during the time frames during which any remaining data portions, or bursts, are transmitted, since it is unnecessary to receive this data.

If the decoding is unsuccessful at block 530, another burst in the next successive time interval is received at block 550 and the process repeats until decoding is successful or until the data portions, or bursts, in all intervals, or time frames, are received. The data for any timeslots not yet received is marked as unreliable prior to decoding as discussed above.

In one embodiment, the radio circuits are operated in reduced power consumption mode during the $1^{st}$ interval or time period of the data transmission, and the $1^{st}$ burst received is in the $2^{nd}$ time frame. In this alternative embodiment, after an unsuccessful comparison with any known data as discussed above, the $2^{nd}$ burst received at block 510 is in the $3^{rd}$ time frame, and any subsequent burst received is in the $4^{th}$ time frame, which is the last time frame for CCCH frames in GSM networks. According to this embodiment, the radio circuit will operate at most for three of the exemplary four time frames, and in some instances the radio circuits may operate for only two of the four time frames, i.e. the $2^{nd}$ and $3^{rd}$ time frames, if decoding is successful for incoming data from only two received bursts. This mode of operation will be reliable only where and when channel conditions are optimum, but will provide substantial power savings.

In another alternative embodiment, the $1^{st}$ burst received is in the $3^{rd}$ time frame, and any subsequent $2^{nd}$ burst received, at block 510 in FIG. 5, is in the $4^{th}$ time frame. The radio circuits are operated in reduced power consumption mode during the $1^{st}$ and $2^{nd}$ intervals or time periods of the data transmission. According to this embodiment, the radio circuit will operate at most for two of the exemplary four time frames, i.e., the $3^{rd}$ and $4^{th}$ time frames, if decoding is successful for incoming data from only two received bursts. If decoding is unsuccessful, the MS must wait for the next message transmission. This mode of operation will only be viable where channel conditions are optimum, but will provide substantial power savings.

In embodiments where incoming data from only 2 time frames are decoded, a decoding algorithm based on the publication authored by S. Lin Wang entitled "A modified Selective-Repeat Type-II Hybrid ARQ System and Its Performance Analysis", IEEE Transactions on Communications, disclosed for example in of U.S. Pat. No. 5,570,369 entitled "Reduction of Power Consumption In A Mobile Station" may be more efficient than a Viterbi decoding algorithm.

The equalization and decoding operations are performed in the DSP as is known by those having ordinary skill in the art. The comparison and weighting processes are also performed by the DSP. In receivers having GSM architectures, a secondary control portion resides inside the GSM signaling stack MCU code layer 1.

The present disclosure thus provides methods for significantly reducing power consumption in radio receivers by operating in reduced power consumption mode when it is unnecessary to receive burst data. The processing of received data portions is streamlined by determining first whether the likelihood that an initial incoming data portion corresponds to a known data portion, and where the likelihood is good reconstructing and validating the message by combining the received data portion with other known data portions of the known message. If the likelihood is not good, additional data portions are received and the message is decoded with the assumption that any data portions not yet received are invalid. The process repeats until decoding is successful, which may be verified by a CRC operation. The disclosure is applicable to any communications system that receives message in portion transmitted over successive interval, for example GSM communications.

While the present disclosure and what is considered presently to be the best modes thereof have been described in a manner that establishes possession thereof by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A mobile wireless communication device, comprising:
   a receiver;
   a controller coupled to the receiver,
   the controller configured to cause the receiver to receive not more than one burst of an incoming paging message transmitted in a series of bursts over successive time frames,
   the controller configured to determine whether the incoming paging message corresponds to a known paging message by comparing incoming data of the not more than one received burst with known data of a corresponding burst of the known paging message,
   the controller configured to combine the incoming data with known data of a different burst of the known paging message only if results of comparing satisfy a specified requirement.

2. The device of claim 1, the controller configured to reconstruct the incoming paging message by decoding the combined incoming data and the known data and to determine whether the reconstructed incoming paging message corresponds to the known paging message.

3. The device of claim 2, the controller configured to store known data from at least a portion of the known paging message received in several bursts over successive time frames.

4. The device of claim 1, the controller configured to measure a channel quality of the incoming paging message and to rescale the known data based on the channel quality of the incoming paging message.

5. The device of claim 1, the controller configured to reconstruct the incoming paging message by decoding data of the not more than one received burst and a burst in subsequent time frame of the incoming paging message if the results of comparing do not satisfy a specified requirement.

6. The device of claim 5, the controller configured to determine whether the reconstructed incoming paging message corresponds to the known paging message.

7. The device of claim 1,
   the not more than one burst of the incoming paging message is a burst in a first time frame of the series of consecutive time frames,
   the controller configured to compare incoming data of the burst of the first time frame of the incoming paging message with known data of a burst of a first time frame of the known paging message,
   the controller configured to combine the incoming data of the burst of the first time frame of the incoming paging message with known data of bursts of other time frames of the known paging message only if results of comparing satisfy a specified requirement, the controller configured to reconstruct the incoming paging message by decoding the combined incoming data and the known data, the controller configured to determine whether the incoming paging message corresponds to the known paging message.

8. The device of claim 1, the not more than one burst of the incoming paging message is a burst in a second time frame of the series of consecutive time frames, the controller configured to compare incoming data of the burst of the second time frame of the incoming paging message with known data of a burst of a second time frame of the known paging message, the controller configured to combine the incoming data of the burst of the second time frame of the incoming paging message with known data of a burst of different time frames of the known paging message only if results of comparing satisfy a specified requirement, the controller configured to reconstruct the incoming paging message by decoding the combined incoming data and the known data, the controller configured to determine whether the incoming paging message corresponds to the known paging message.

9. A mobile wireless communication device, comprising:
a receiver;
a controller communicably coupled to the receiver, the controller configured to
cause the receiver to receive not more than one burst of an incoming paging message transmitted in a series of bursts over successive intervals,
combine the portion of the incoming message with a portion of a known message, and
reconstruct a message from the portion of the incoming message and the portion of the known message.

10. The device of claim 9, the controller configured to the mobile wireless communication device in a reduced power consumption mode during remaining intervals of the incoming message if the incoming message corresponds to the known message.

11. The device of claim 9, the controller configured to store known paging data from at least a portion of a no-identity paging message received in several bursts over consecutive intervals, the known paging data corresponding to the known message.

12. The device of claim 9, the controller configured to cause the receiver to receive the portion of the incoming message in not more than a first one of the consecutive intervals.

13. The device of claim 9, the controller configured to cause the receiver to receive the portion of the incoming message in not more than a second one of the consecutive intervals without receiving any portion of the incoming message in a first of the consecutive intervals.

14. The device of claim 13, the controller configured to cause the receiver to receive another portion of the incoming message in a third one of the consecutive intervals if the incoming message does not correspond to the known message.

15. The device of claim 9, the controller configured to cause the receiver to compare the portion of the incoming message with a corresponding portion of a known message and combine the portion of the incoming message with the portion of the known message only if results of comparing the portion of the incoming message with the corresponding portion of the known message satisfy a specified requirement.

16. The device of claim 9, the controller configured to cause the receiver to rescale the portion of the known message based on a channel quality of the incoming message.

17. The device of claim 9, the controller configured to cause the receiver to combine the portion of the incoming message with the portion of the known message by combining the portion of the incoming message of not more than one consecutive interval with portions of the known message from all other intervals of the incoming message not received.

* * * * *